United States Patent [19]

Pritchard

[11] Patent Number: 4,814,864
[45] Date of Patent: Mar. 21, 1989

[54] VIDEO CAMERA WITH AUTOMATIC PRESCALING FOR COLOR BALANCE

[75] Inventor: Jeffery A. Pritchard, Rochester, N.Y.

[73] Assignee: Eastman Kodak Co., Rochester, N.Y.

[21] Appl. No.: 56,629

[22] Filed: May 29, 1987

[51] Int. Cl.$^4$ .............................................. H04N 9/73
[52] U.S. Cl. ...................................... 358/29; 358/41; 355/35
[58] Field of Search ................... 358/29 C, 29, 41, 44; 355/38, 35

[56] References Cited

U.S. PATENT DOCUMENTS

| | | | |
|---|---|---|---|
| 3,502,410 | 3/1970 | King et al. | 355/38 |
| 3,735,026 | 5/1973 | Smith et al. | 178/5.4 R |
| 4,047,202 | 9/1977 | Poetsch | 358/29 |
| 4,154,523 | 5/1979 | Rising et al. | 355/38 |
| 4,159,174 | 6/1979 | Rising | 355/38 |
| 4,168,120 | 9/1979 | Freier et al. | 355/38 |
| 4,217,648 | 8/1980 | Thurm et al. | 364/526 |
| 4,244,653 | 1/1981 | Asai et al. | 356/404 |
| 4,279,505 | 7/1981 | Ursprung et al. | 355/77 |
| 4,281,337 | 7/1981 | Nakamura | 358/29 |
| 4,299,479 | 11/1981 | Harvey et al. | 355/38 |
| 4,335,397 | 6/1982 | Tamura | 358/29 |
| 4,339,517 | 7/1982 | Akimoto | 430/30 |
| 4,340,903 | 7/1982 | Tamura | 358/10 |
| 4,389,118 | 7/1983 | Yuasa | 356/404 |
| 4,395,730 | 7/1983 | Shen | 358/29 |
| 4,416,539 | 11/1983 | Terashita | 355/77 |
| 4,492,458 | 1/1985 | Bickl et al. | 355/38 |
| 4,503,508 | 3/1985 | Brooks et al. | 364/525 |
| 4,575,225 | 3/1986 | Yuasa et al. | 355/38 |
| 4,584,598 | 4/1986 | Kutaragi | 358/29 |
| 4,638,350 | 1/1987 | Kato et al. | 358/29 |
| 4,646,161 | 2/1987 | Isuchiya et al. | 358/29 |
| 4,682,210 | 7/1987 | Ikemura et al. | 358/29 |
| 4,731,661 | 3/1988 | Nagano | 358/29 C |

FOREIGN PATENT DOCUMENTS 184079 8/1986 Japan .

OTHER PUBLICATIONS

Reseach Disclosure, Apr. 1983, No. 22822, pp. 157–159.
Research Disclosure, Mar. 1982, No. 21504, pp. 70–71.

Primary Examiner—James J. Groody
Assistant Examiner—Robert M. Bauer
Attorney, Agent, or Firm—David M. Woods

[57] ABSTRACT

A color balance circuit for a video camera bases red and blue gain adjustments on the ratios of red and blue light to green light in the scene. Before sequentially integrating red, green and blue light for the color balance calculation, certain process parameters are prescaled for the level of scene illumination. In particular, the integration reference voltage and the clock frequency of the time base (timing the integration) are scaled according to the level of green light so that subsequent integration of expected light levels yields results in the midrange capacity of the integrator.

18 Claims, 7 Drawing Sheets

4,814,864

VIDEO CAMERA WITH AUTOMATIC PRESCALING FOR COLOR BALANCE

BACKGROUND OF THE INVENTION

1. Field of the Invention

This invention pertains to the field of signal processing for video cameras and, in particular, to an automatic color balance circuit for a video camera.

2. Description Relative to the Prior Art

A video camera is correctly color-balanced when it reproduces a picture of a white card as a neutral white without any identifiable hue. (As a result, color balance for a video camera is often referred to as white balance.) Such a balance is ordinarily obtained when the card is illuminated with the light source used for recording and the red, green, and blue signal channels provide equal output amplitudes. If the light source is changed, such as in going from an indoor (tungsten or fluorescent lighting) to an outdoor setting, the camera must be rebalanced to provide the same output in relation to the white card with the new source of lighting (in this case, the sun). The usual practice is to hold the gain of the green channel fixed and alter the gain of the red and blue channels until the red and blue amplitudes match the green amplitude.

Many cameras now are automatic in that the red and blue amplitudes are matched to the green amplitude by an automatic gain control circuit at the touch of an "auto white" button. The procedure is to point the camera at a white card in the light used for recording, to frame the card so that it occupies the entire picture, and to press the "auto white" button. White balance is thereby effected although "auto" is somewhat of a misnomer since the camera user must manually engage the white balance circuit for each new lighting condition. Many cameras are also equipped with a memory circuit that stores the gain factors of the red and blue channels so that the camera will remain balanced for a particular light source.

It is clearly inconvenient to have to manually rebalance the red and blue channels whenever illumination conditions change, and especially inconvenient to do so in connection with a white card. Moreover, the illumination should come from as wide an area as possible so that color measurements relate to the color characteristics of incident light on the scene, rather than to reflected light from the subject, which may possess an unusual color bias. The tendency, consequently, has been to find ways of predicting white balance by comparing illumination levels for isolated areas of the ambient spectrum (that is, without resort to a white card). In U.S. Pat. No. 4,395,730 the ratios of red light to green light and blue light to green light from external sensors are used to effect an automatic white balance adjustment. In U.S. Pat. No. 4,584,598 the luminous intensities of two areas of the ambient spectrum (mercury and certain infra-red wavelengths) are used to identify the character of the light source.

An automatic white balance system that measures different regions of the ambient scene spectrum must content with a wide variation in illumination level, i.e., a wide dynamic range. This complicates the light measurement procedure because extreme light levels tend to drive the measurement toward its extremities, e.g., the extremities of a time-based measurement or of an analog-to-digital conversion. This is especially critical if white balance is based upon a ratio of illuminants, since poor resolution in the numerator and denominator leads, in many cases, to either meaningless values or ratio values indistinquishable one from the other. The U.S. Pat. No. 4,584,598 tries to deal with this problem by logarithmically compressing the light measurements prior to A/D conversion. Logarithmic compression at this point in the circuit, however, tends to reduce the resolution of light measurements, especially for extreme light levels.

Adopting a different approach, U.S. Pat. No. 4,646,161 discloses an automatic white balance control circuit which standardizes the red and blue light measurements with respect to the green light. All three colors are simultaneously integrated but only the green integration is directly controlled in relation to a reference level. When the green integration signal matches the reference level, all three integrations are sampled and held. In this way, the green signal is made constant regardless of the amount of incident light and the concurrent integrations of red and blue are standardized to a fixed reference—the green signal. This is said to produce increased stability in color balance. Nonetheless, a reference level has to be established with respect to some expected light condition. The dynamic range of ambient illumination is such that some measurements will be unsatisfactory as the green integration either quickly terminates in extremely bright light or drags on in extremely dim light.

SUMMARY OF THE INVENTION

The invention adopts the technique of light integration in which red, green and blue light is allowed to integrate until it matches one or more preselected reference values. The time that this take in each spectral region is thus a measure of the chromatic character of the illuminant. Ordinarily the integration range is chosen to straddle some average, expected light level so that reasonable time resolution can be expected for the light-related signals. Nonetheless, as already pointed out, very low and very high light levels defeat this technique of white balance, since the light measurements either ten to crowd into but a few time counts (high intensity) or tend to overflow the maximum limit of the time base (low intensity). This invention provides an automatic solution to this kind of problem.

A color balance circuit improved according to the invention includes a light sensing arrangement for generating a color balance signal representative of the brightness of the illuminant in at least one spectral region. The circuit provides for the integration of the color balance signal over time in relation to a reference parameter. The benefits of the invention are obtained by prescaling the reference parameter according to the intensity of ambient illumination. The color balance signal is then integrated in relation to the prescaled reference parameter. A balance-adjusted gain control signal is generated from the integrated color balance signal. In one embodiment the reference parameter is a threshold voltage and the scaling procedure adjusts the threshold voltage in order to control the period of integration (for the given illuminant) in relation to the midrange capacity of the integrator. The reference parameter may also be a frequency-dependent time base and the scaling procedure adjusts the time base frequency in order to control the time-wise precision of the integration measurement. In the preferred embodiment, both the threshold voltage and the time base are adjusted.

BRIEF DESCRIPTION OF THE DRAWINGS

The invention will be described in relation to the drawings, in which.

DETAILED DESCRIPTION OF THE PREFERRED EMBODIMENT

Figure 1:
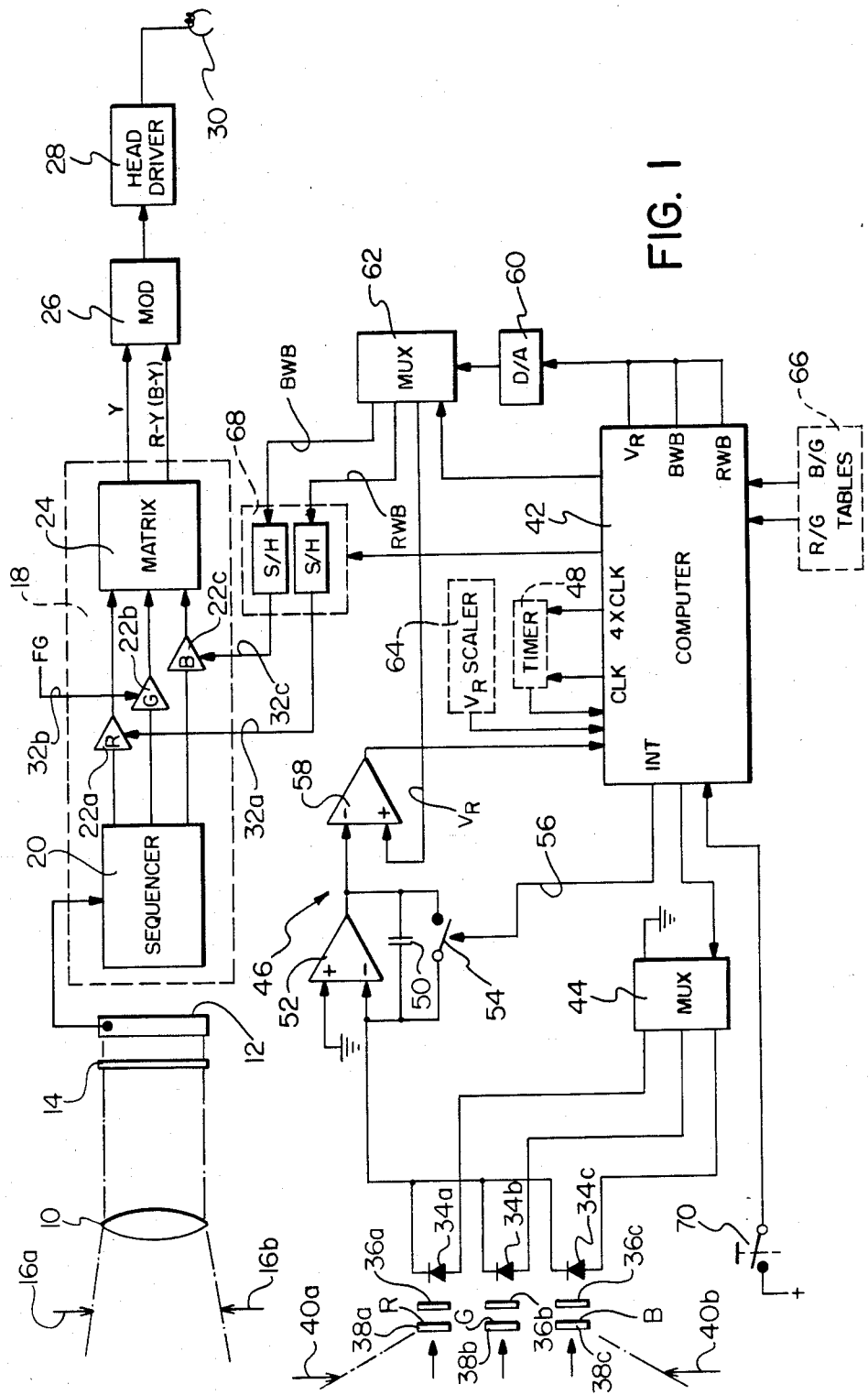
FIG. 1 is a block diagram of a video camera incorporating a prescaled color balance circuit according to the invention.

Referring to FIG. 1, a video camera is illustrated having a lens 10 for directing image light from a subject (not shown) to an imager 12 through a color filter 14. While the specific type of video camera is not of particular importance, the color balance circuit has been adapted to an electronic camera for taking still photographs. As shown schematically by the arrows 16a and 16b, the field of view of the imager 12 is limited to a predetermined angle determined by the optical system, as symbolized by the lens 10. The video signal generated by the imager 12 is applied to a signal processing circuit 18, which separates the colors (red, green, and blue) by means of a sequencer 20, applies gain corrections in separate gain-controlled amplifiers 22a, 22b and 22c, and processes the gain-corrected color signals through a matrix 24. The matrix 24 produces a luminance (Y) signal and a line-sequential stream of color difference signals (R-Y, B-Y). The luminance signal and the color difference signals are input to a modulator 26, which provides a selected preemphasis to the input signals and frequency modulates a suitable set of carriers with the preemphasized signals. The modulated signal is amplified by a head driver circuit 28 and applied to a recording head 30, which records the modulated signal on a suitable medium (not shown), such as a magnetic disk.

Automatic color balance is obtained according to the invention by varying the gain signal applied to the amplifiers 22a and 22c on respective lines 32a and 32c. (A fixed gain signal is applied to the green amplifier 22b on a line 32b.) Color balance information produced by three photodiodes 34a, 34b and 34c, which are respectively shaded by three infra-red filters 36a, 36b and 36c and red, green and blue filters 38a, 38b and 38c. As a consequence of the color filters 38a, 38b and 38c, the photodiode 34a response to red light, the photodiode 34b to green light, and the photodiode 34c to blue light. A shown by the arrows 40a and 40b, the set of photodiodes 34 responds to a field of view that is independent of, and ordinarily greater than, the field of view described by the lens 10 so that a reasonable sample of ambient, or surrounding, illumination can be seen.

The collection and processing of color information is under the control of a computer 42. A multiplexer 44 receives instructions from the computer 42 to ground the anode of a selected one of the photodiodes 34a, 34b or 34c. The grounded photodiode provides a circuit path for the flow of photocurrent to a balance measuring circuit 46. The circuit 46, which employs an integration cycle in its measuring process, cooperates with a counting procedure (exemplified by a timer 48) in the computer 42 to arrive at a brightness value of the selected spectral region of the ambient light. The measuring circuit 46 includes an integrator composed of a capacitor 50 connected between the inverting input and the output of an operational amplifier 52. The output of the amplifier 52 is an integral over time of the photocurrent produced by the selected photodiode 34a, 34b or 34c and applied to the inverting input of the amplifier 52. A reset switch 54 is connected across the capacitor 50 for resetting the circuit 46 according to the condition of a signal INT on a line 56 from the computer 42.

The output voltage of the amplifier 52 and a reference voltage $V_R$ are provided to a comparator 58. The value $V_R$ is output as a digital number from the computer 42 and converted into an analog voltage by the digital-to-analog (D/A) converter 60. The analog voltage $V_R$ is switched through a multiplexer 62 (controlled by the computer 42) to the comparator 58 when a voltage comparison to required. The output voltage of the amplifier 52 increases until it equals the reference voltage $V_R$. When equality occurs, the output of the comparator 58, which is connected to the computer 42, changes state, thereby indicating the end of an integration cycle. The computer 42 includes the timer 48, which can be zeroed at the beginning of an integration cycle and stopped when the comparator 58 changes state. The value in the counter 48 at that moment therefore represents the integration time, which corresponds to the brightness of the light received by a selected photodiode 34a, 34b or 34c. The type of control circuit employed is further described in connection with exposure control systems in U.S. Pat. No. 4,503,508 and Research Disclosure items 21504 (March, 1982; pp. 70-71) and 22822 (April, 1983; pp. 157-159).

The operation of the balance measuring circuit 46 according to the invention is determined by the value of two reference parameters: the reference voltage $V_R$ and a frequency-dependent time base provided to the timer 48. The procedure for scaling the reference voltage $V_R$ is determined by a $V_R$ scaler 64 (shown in broken line to indicate that it is part of the computer 42). The time base is scaled by selecting one of a pair of count signals provided by the computer 42: a basic count signal CLK and a fast count signal 4XCLK operating at four times the basic count frequency. As will be shown in connection with the flowchart of FIG. 2, the scaling process involves a predetermination based on the integration of a sample of green light. In particular, the period of the pre-integration—as determined by a green count value GCNT in the timer 48 when the integrated voltage matches a nominal reference voltage $V_{RNOM}$ supplied to the comparator 58—is compared to a threshold count value to select the appropriate count signal. This period measurement is also used in the $V_R$ scaler 48.

The balance circuit 46 is operated sequentially with respect to the photodiodes 34a, 34b and 34c in order to obtain a set of three counter values, each corresponding to the brightness of the respective part of the ambient spectrum. These counter values are formed into ratios (red/green and blue/green) and applied to a set of R/G and B/G tables 66. The tables contain a digital representation of the particular gain control adjustment for each R/G, B/G ratio that will produce a suitable white balance when applied to the red and blue channels. From these tables 66, the corresponding (blue) white balance (BWB) and (red) white balance gain (RWB) voltages are generated by the computer 42 and applied to the aforementioned D/A converter 60. The converted red and blue gain control voltages are switched through the multiplexer 62 to a dual sample/hold circuit 68. The sampled red and blue gain control voltages are provided on respective lines 32a and 32c to the red and blue amplifiers 22a and 22c, which are accordingly adjusted in gain to automatically obtain white balance.

Figure 2A:
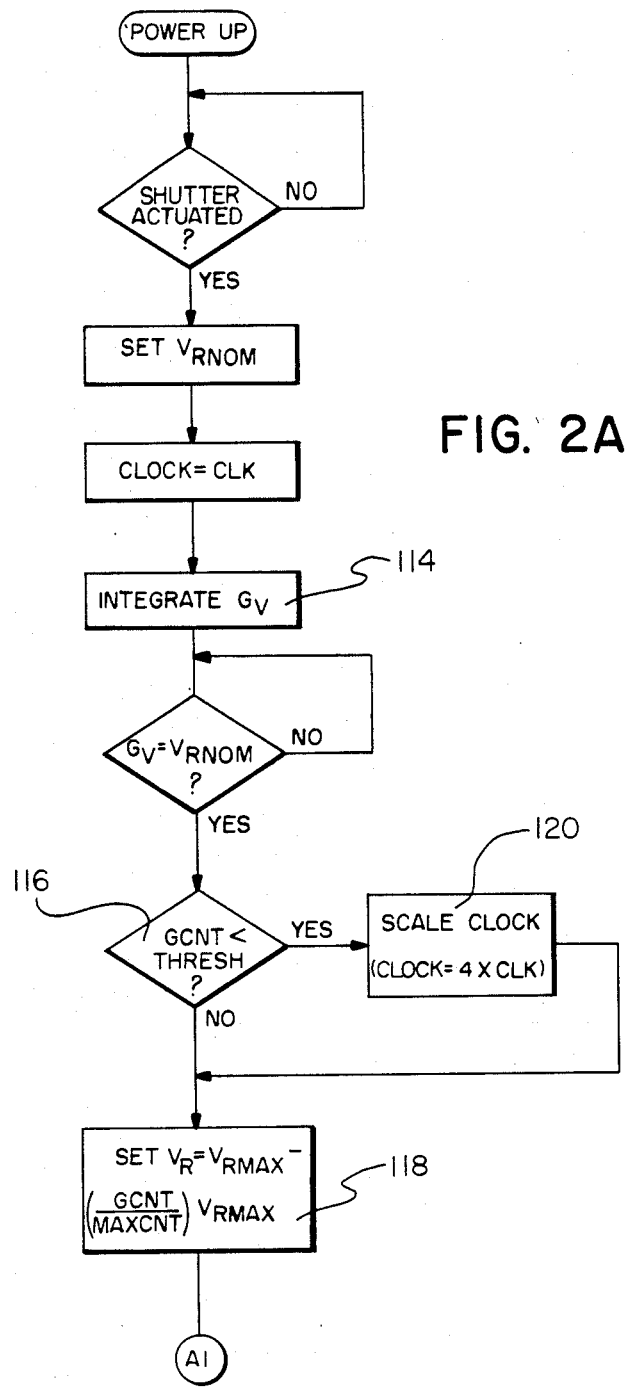
FIGS. 2A-2E show a flow chart of a procedure, including the prescaling feature according to the invention, for automatically balancing the color channels of the camera of FIG. 1.
Figure 3:
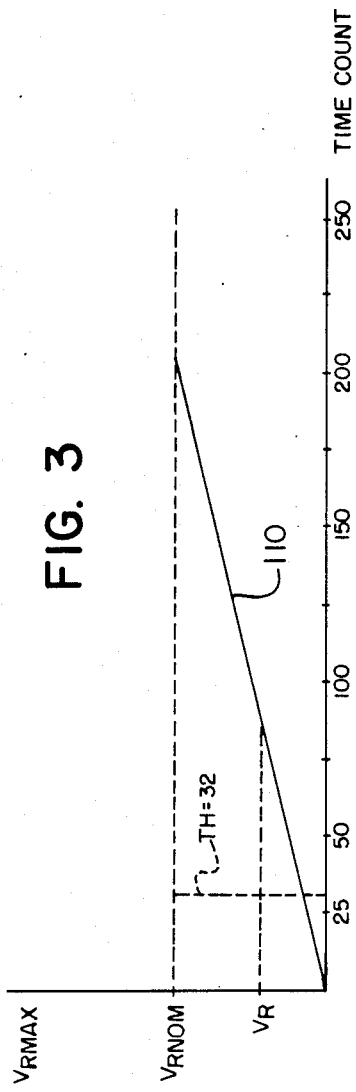
FIG. 3 is a graph showing the effect of prescaling one parameter, in this case the integration reference voltage.
Figure 4:
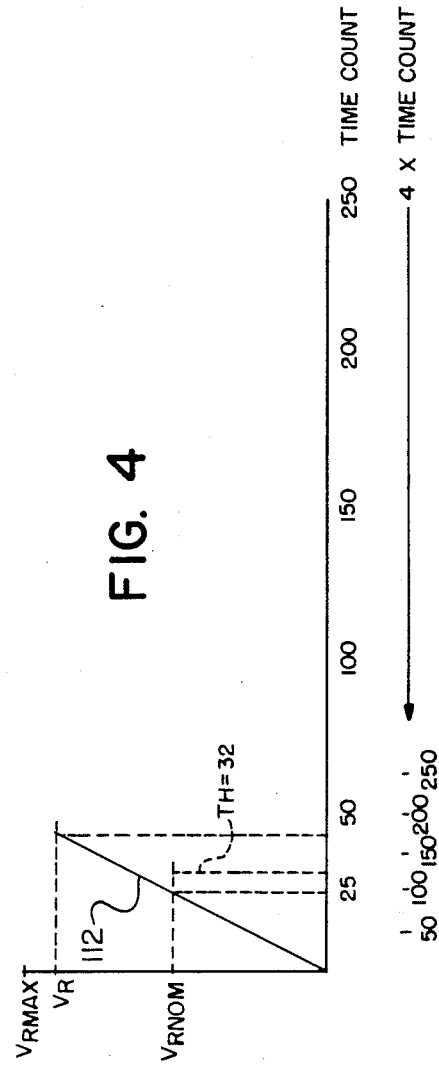
FIG. 4 is a graph showing the effect of prescaling two parameters, both the integration reference voltage and the frequency-dependent time base.

The procedure for obtaining automatic color balance is shown by a flowchart extending over FIGS. 2A to 2E. The first steps, as shown in FIG. 2A, involve the prescaling process that is the special feature of this invention. A graphical representation of this feature is shown in FIGS. 3 and 4. As soon as the shutter is actuated (by lightly depressing a shutter switch 70 part way through its shutter stroke; and FIG. 1), a nominal reference voltage $V_{RNOM}$ is supplied to the comparator 58 (i.e., $V_R = V_{RNOM}$). As shown by FIG. 3, the voltage $V_{RNOM}$ is set somewhere about midway between zero volts and a maximum voltage $V_{RMAX}$. Then the counter time base is set to the frequency of the basic count signal CLK. The computer 42 instructs the multiplexer 44 to ground the green-receiving photodiode 34b and the integrated voltage increases (in a process step 114) until it reaches a level $G_V$ that matches the reference voltage $V_{RNOM}$.

The count GCNT in the timer 48 at this time is compared in a process step 116 to a threshold count. In the preferred embodiment, the counter is an 8-bit counter, thus reaching 256 before overflowing. The time base of counter 48 and the reference voltage $V_R$ should be set up so that, after prescaling, a reasonable level of counts is reached regardless of light level. For this reason, a threshold of 32 is shown in FIGS. 3 and 4. If the green count GCNT is less than the threshold (32 counts), the counting frequency is scaled up by a factor of 4 in a process step 120 (by selection of the count signal 4XCLK), so that even very bright scenes will still accumulate a reasonable number of counts. This conclusion is illustrated by the lower time scale on the abscissa coordinate of the graph of FIG. 4.

Next, a value of $V_R$ is calculated in a process step 118 so that the integrated voltage will reach the reference voltage nearer the midpoint of the counting scale (or at least away from the scale extremities). This is shown by FIGS. 3 and 4. In particular, a reference is selected such that $$V_R = V_{RMAX} - GCNT/MAXCNT \, V_{RMAX}$$

where MAXCNT = 256

The calculated voltage $V_R$ is then coupled from the computer 42 to the comparator 58 via the D/A converter 60 and the multiplexer 62 (the multiplexer is appropriately addressed at this time for this purpose).

Figure 2B:
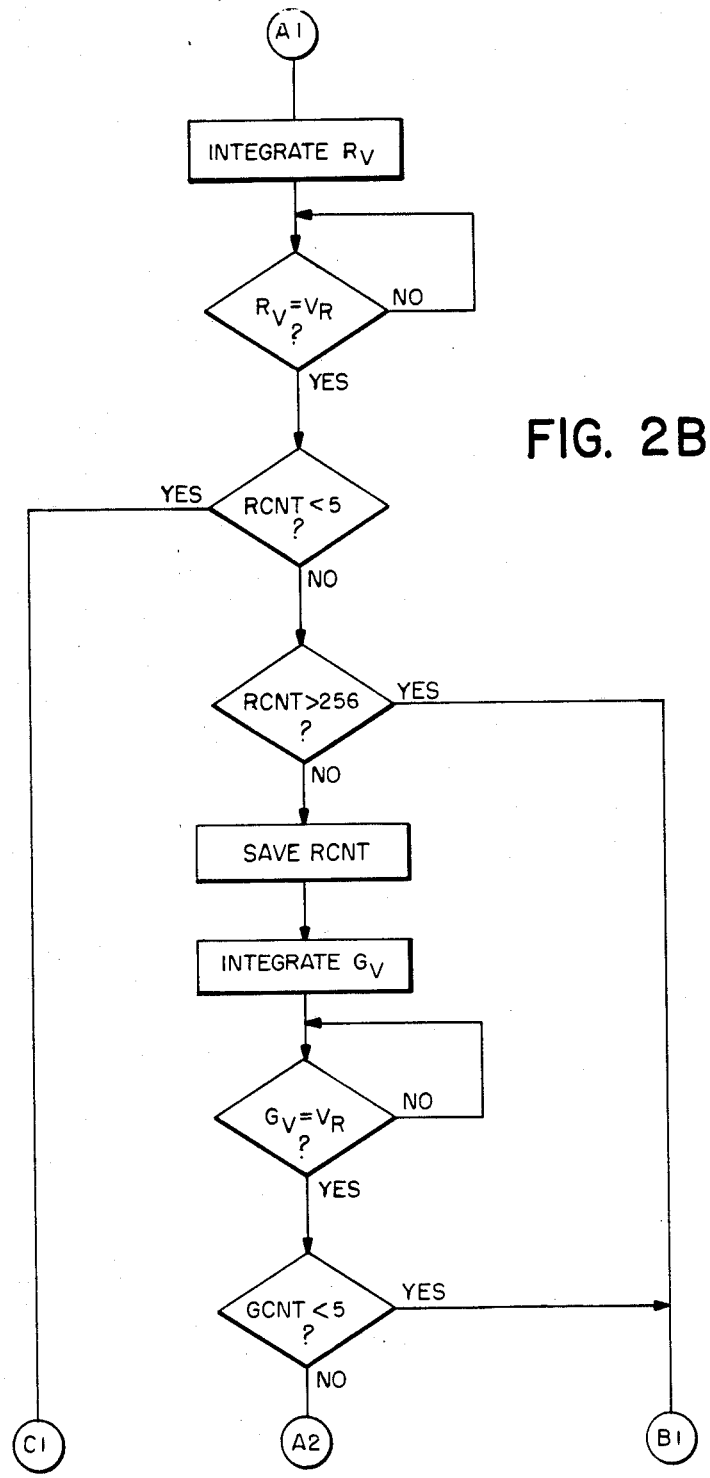
Figure 2C:
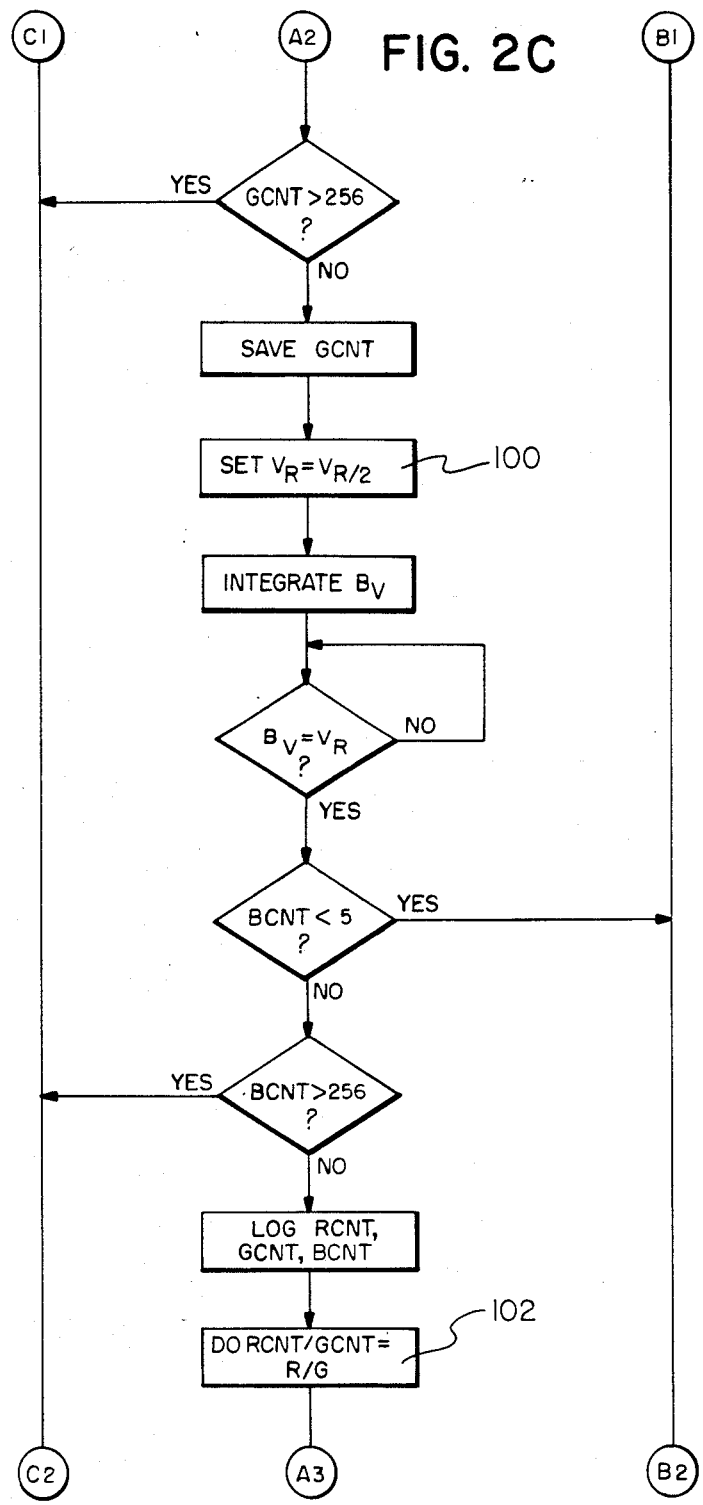

The next portion of the flowchart shown by FIGS. 2B and 2C illustrate the integration, after prescaling, of a red voltage $R_V$, a green voltage $G_V$ and a blue voltage $B_V$. In each case, (referring to FIG. 1) the integrator is cleared by closing the switch 54, the proper photodiode is activated according to the address received by the multiplexer 44, and integration proceeds until the voltage at the output of the amplifier 52 matches the reference voltage $V_R$ supplied to the comparator 58. At the latter moment, the timer 48 is stopped and the value therein is denoted as either a red count RCNT, a green count GCNT, or a blue count BCNT.

Figure 2D:
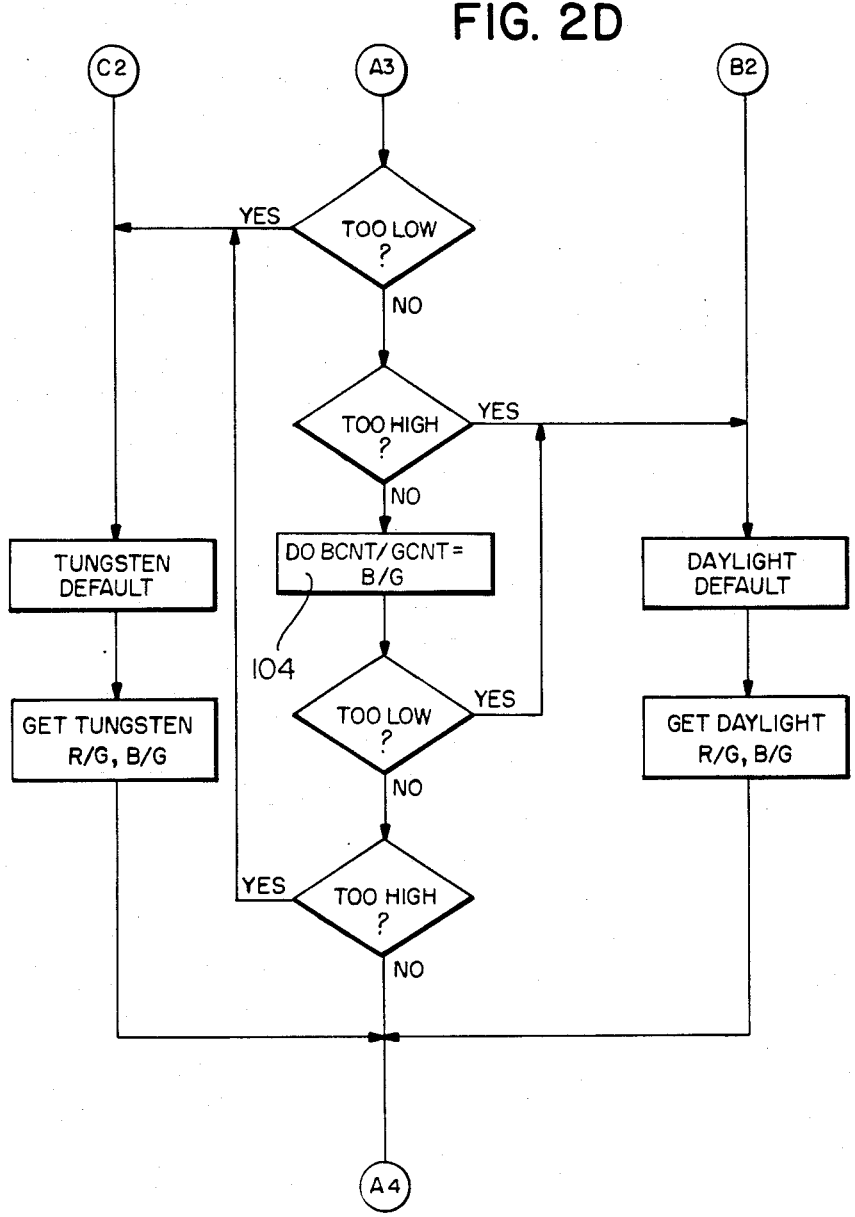

As shown by FIGS. 2B, 2C and 2D the procedure incorporates several default routines in which the counts are compared to especially low (5 counts) and high (256 counts, or overflow) values. The present of such values indicate extreme illumination conditions (low counts corresponding to very high illumination and high counts to very low illumination). An especially small red count or especially large green or blue counts correspond to tungsten lighting while the converse indicates an unusual situation in which daylight default is believed to usually be the safest choice. In FIG. 2C, a process step 100 is included for halving the value of the reference voltage $V_R$ before blue light integration begins. This is done because of the lower sensitivity of a photodiode to blue light than to red or green light. (The high sensitivity to red light is the reason for the infra-red filters 38a, 36b and 36c in front of the respective photodiodes.)

Figure 2E:
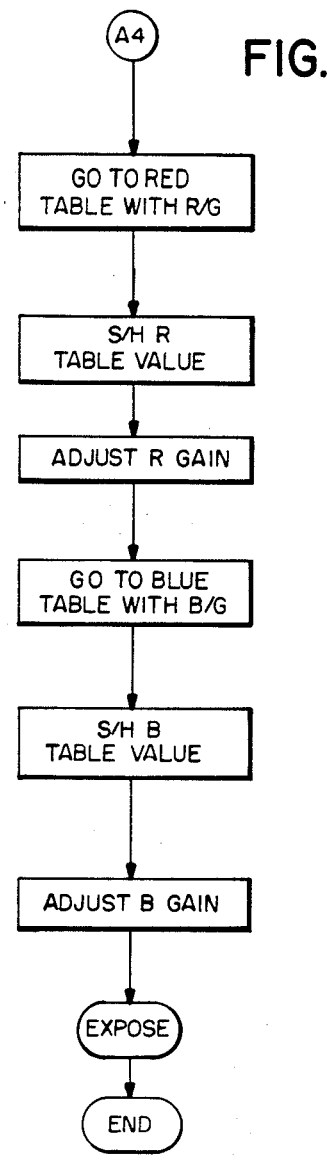

In FIGS. 2C and 2D process steps 102 and 104 are included for calculating red to green (R/G) and blue to green (B/G) ratios. Each ratio is tested against extreme high or low values and the proper default is again applied if the R/G ratio is high (meaning a lot of red light) or if the B/G ratio is low (meaning little blue light). In such situations, tungsten lighting is assumed. For the converse situations, daylight is selected. After the default tests are completed, and as shown by FIG. 2E, the table 66 is addressed by means of the R/G and B/G ratio values and suitable gains adjustments are selected an coupled by way of the computer 42 to the red gain-controlled amplifier 22a and to the blue gain-controlled amplifier 22c.

FIGS. 3 and 4 graphically show the effects of low and high illumination, respectively, in the prescaling process illustrated by FIG. 2A. The lines 110 and 112 represent the initial integration of green light in the process step 114 of FIG. 2A. In the example of FIG. 3, the light level is quite low and the integration voltage does not reach the nominal reference voltage $V_{RNOM}$ until the count GCNT in the timer 48 reaches about 200. Since the count GCNT is greater than the threshold of 32 (process step 116), only the reference voltage $V_R$ is adjusted in the process step 118. The calculation there shown results in a voltage $V_R$ less then $V_{RNOM}$ and, consequently, a shorter integration time for subsequent integrations. If, as in FIG. 4, a high light level causes the integrator to reach $V_{RNOM}$ before the threshold count is obtained, the decision step 116 causes activation of the clock scaling process in the step 120. A shown by the lower time base scale in FIG. 4, subsequent integration will be timed by a clock running at four times the nominal rate. In addition, the subsequent adjustment of the reference voltage $V_R$ in the step 118 moves the voltage $V_R$ closer to $V_{RMAX}$. Then, as a result of both time base and voltage adjustments, subsequent integrations will reach the reference voltage $V_R$ in the approximate midrange of counter capacity. Prescaling, as shown in both FIGS. 3 and 4, places normal light levels toward the midrange of the counter 48, thereby ensuring that abnormal light levels will not result in extreme counts, either near zero or overflow conditions. The resulting R/G and B/G ratios are therefore better predictors of actual scene color balance.

The invention has been described in detail with particular reference to a presently preferred embodiment thereof, but it will be understood that variations and modifications can be effected within the spirit and scope of the invention. For example, the thresholds that trigger the clock scaling process 120 in FIG. 2A and the defaults in FIGS. 2B and 2C are representative of an empirical determination; other thresholds would clearly be workable. Likewise, the calculation of $V_R$ in the process step 118 of FIG. 2A is the result of an empirical formulation and is not intended to dismiss other equations of similar usefulness. The use of but two frequencies for time base variation can be extended either to many discrete frequencies or to a smoothly varying scale of frequencies.

What is claimed is:

1. A color balance circuit for use in a video camera having an image sensor that produces a plurality of color image signals and a signal processing section that processes the color image signals in separate channels, at least one of said channels being responsive to a gain control signal from the color balance circuit, said color balance circuit comprising:

color balance sensing means responsive to illumination in at least one spectral region for generating a color balance signal;

means for generating a reference parameter in relation to which the color balance signal is processed;

means for scaling said reference parameter according to the intensity of light received by said color balance sensing means;

means for integrating said color balance signal over time in relation to the scaled reference parameter; and means for generating said gain control signal from said integrated color balance signal.

2. A color balance circuit as claimed in claim 1 in which said reference parameter is a threshold voltage for determining the end of integration and said scaling means adjusts said threshold voltage in order to control the period of integration.

3. A color balance circuit as claimed in claim 1 in which said reference parameter is a frequency-dependent time base for measuring the period of integration and said scaling means adjusts the frequency of the time base in order to control the time-wise precision of measurement.

4. A color balance circuit as claimed in claim 1 in which said color balance sensing means is responsive to at least one spectral region to which said image sensor responds.

5. A color balance circuit as claimed in claim 4 in which said scaling means is responsive to a spectral region to which said color balance sensing means responds.

6. A color balance circuit as claimed in claim 1 in which said color balance sensing means responds to ambient illumination over an area greater than that covered by said image sensor.

7. A color balance circuit as claimed in claim 1 in which said generating means generates a second reference parameter and said reference parameters include a threshold voltage for determining the end of integration and a frequency-dependent time base for measuring the period of integration, and said scaling means cooperatively adjusts said threshold voltage and said time base frequency in order to control the period of integration and the scale of measurement.

8. A color balance circuit as claimed in claim 1 in which said scaling means is responsive to the intensity of green light.

9. A video camera having a signal processing section for separately processing at least one color video signal in a respective gain-modification state to thereby restore white balance whenever the camera is confronted with a changing illuminant, said camera comprising:

means for detecting the level of ambient illumination in a plurality of spectral regions;

means, responsive to said detecting means, for integrating a voltage signal according to the level of said illumination;

control means for generating control parameters for regulating said integrating means, said parameters including a frequency-dependent time base signal for measuring the time of integration and a reference voltage for determining the length of integration;

means responsive to the level of at least one spectral region of said illumination for scaling at least one of said control parameters;

means for measuring an integration period in terms of the value of the time base signal when the integrated voltage signal matches the reference voltage; and means, responsive to the measured output of said integrating means, for controlling the gain of the gain-modification stage.

10. A video camera as claimed in claim 9 in which said frequency-dependent time base signal provides a discrete series of counts that begin with the start of integration and end when the integrated voltage signal matches the reference voltage.

11. A video camera as claimed in claim 10 in which said means for scaling at least one of said control parameters increases the frequency of said frequency-dependent signal in response to increasing scene illumination.

12. A video camera as claimed in claim 9 in which said means for scaling at least one of said control parameters lowers the reference voltage in response to decreasing scene illumination.

13. A video camera as claimed in claim 9 in which said detecting means is responsive to the level of red, green and blue illumination and said scaling means is responsive to the level of green illumination.

14. A video camera as claimed in claim 13, having red and blue gain-modification stages, in which said gain-controlling means controls the gain of said red an blue gain-modification stages in proportion to the ratio of red to green and blue to green illumination, respectively.

15. A video camera that processes red, green and blue video signals through respective amplifiers in separate channels, said camera comprising:

means for sensing the level of red, green and blue illumination;

means for generating red, green and blue color signals from said sensing means;

means for generating a reference voltage for each color signal according to the level of illumination of one of said colors;

means for sequentially integrating said red, green and blue color signals over time until each integrated voltage corresponds to the respective; reference voltage timer means for measuring the time of each respective period of integration;

frequency scaling means for clocking said timing means at a rate dependent upon said level of illumination of said one color;

means for generating one or more ratio signals from the integrated values of the red, green or blue color signals; and means for controlling the gain of at least one of the amplifiers according to the level of said one or more ratio signals whereby white balance between the red, green and blue video signals in the separate channels is maintained despite changes in the illumination.

16. A method of balancing the white level of a video camera by controlling the gain of one or more color channels in the camera, said method comprising the steps of:

sensing a plurality of colors;

generating color signals according to the illumination level of the sensed colors;

scaling the value of one or more reference parameters according to the level of illumination in at least one of said colors;

integrating the color signals in relation to said one or more scaled parameters; and controlling the gain of said one or more color channels in relation to the magnitude of the integrated signals.

17. A method as claimed in claim 16 in which said reference parameter is a threshold parameter and said step of scaling adjusts the threshold parameter in order to control the period of integration.

18. A method as claimed in claim 17 in which said reference parameter is a time measurement parameter and said step of scaling adjusts the precision of measurement.

* * * * *